United States Patent [19]

Offredi

[11] Patent Number: 4,527,018

[45] Date of Patent: Jul. 2, 1985

[54] SUPPORT FOR A ONE-PIECE TELEPHONE

[75] Inventor: Giovanni Offredi, Milan, Italy

[73] Assignee: Gnecchi and Company S.p.A., Milan, Italy

[21] Appl. No.: 386,920

[22] Filed: Jun. 10, 1982

[30] Foreign Application Priority Data

Jun. 17, 1981 [IT] Italy .............................. 60930/81[U]

[51] Int. Cl.$^3$ .............................................. H04M 1/04
[52] U.S. Cl. .................................. 179/146 R; D14/61
[58] Field of Search .............. 179/100 C, 146 R, 147, 179/103, 178; D14/61, 64, 65, 100 R; 179/167, 159

[56] References Cited

U.S. PATENT DOCUMENTS

| | | | |
|---|---|---|---|
| D. 202,787 | 11/1965 | Dreyfuss | D14/64 |
| D. 216,427 | 1/1970 | Dreyfuss | D14/61 |
| D. 216,641 | 2/1970 | Phillips | D14/65 |
| 3,521,008 | 7/1970 | Tyson | 179/100 C |
| 3,845,252 | 10/1974 | Wooters | 179/146 R |
| 3,889,071 | 6/1975 | Davis et al. | 179/146 R |
| 3,956,600 | 5/1976 | Ray | 179/146 R |
| 4,068,102 | 1/1978 | Blomberg | 179/146 R |
| 4,355,212 | 10/1982 | Kosten | 179/100 C |
| 4,395,591 | 7/1983 | Kaczkos | 179/100 C |

Primary Examiner—Gene Z. Rubinson
Assistant Examiner—L. C. Schroeder
Attorney, Agent, or Firm—Gifford, VanOphem, Sheridan, Sprinkle & Nabozny

[57] ABSTRACT

A support for a one-piece telephone of a type incorporating in a single body all the equipment of a conventional two-part telephone, such as the apparatus, and the switch hooks normally positioned on or under the cradle for switching off the telephone when the handset is replaced. The support comprises a back plate having inclined end portions, one at an acute angle and the other at an obtuse angle with respect to the back plate, the former serving as an abutment for the switch hooks of the telephone, to actuate them to turn off the telephone automatically when it is replaced on the support, and the latter cooperating with a central saddle-like projection to define a cradle into which the earpiece of the telephone can be fitted and retained by means of slight flexure which is permitted by the material of which the device is made, that is a slightly resiliently or semirigid material such as a foamed plastics, rubber or the like.

10 Claims, 8 Drawing Figures

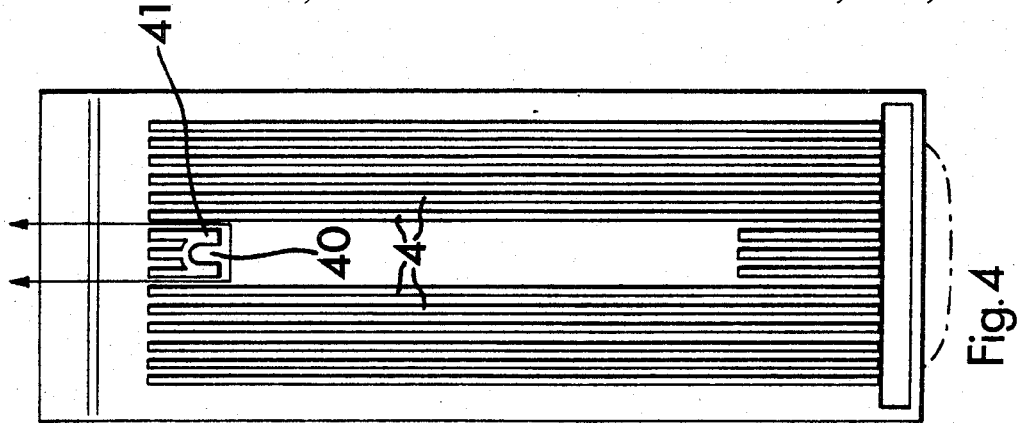
Fig. 4
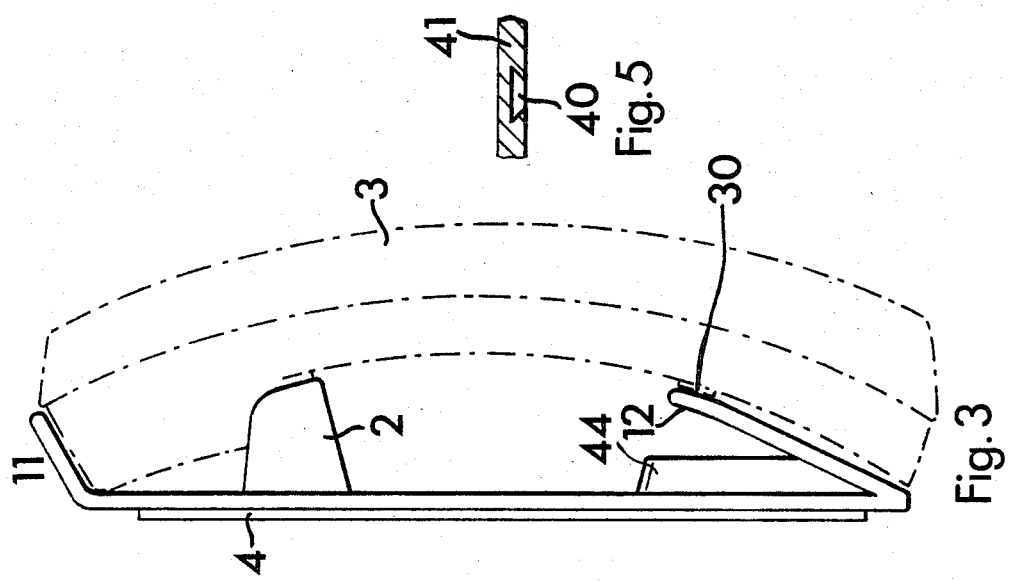
Fig. 5
Fig. 3
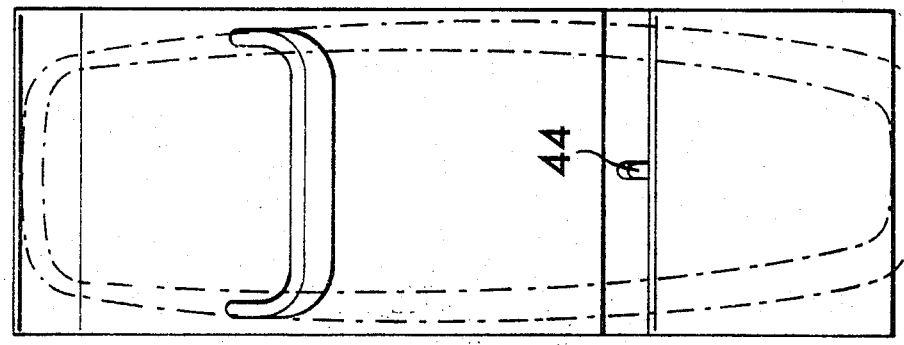
Fig. 2

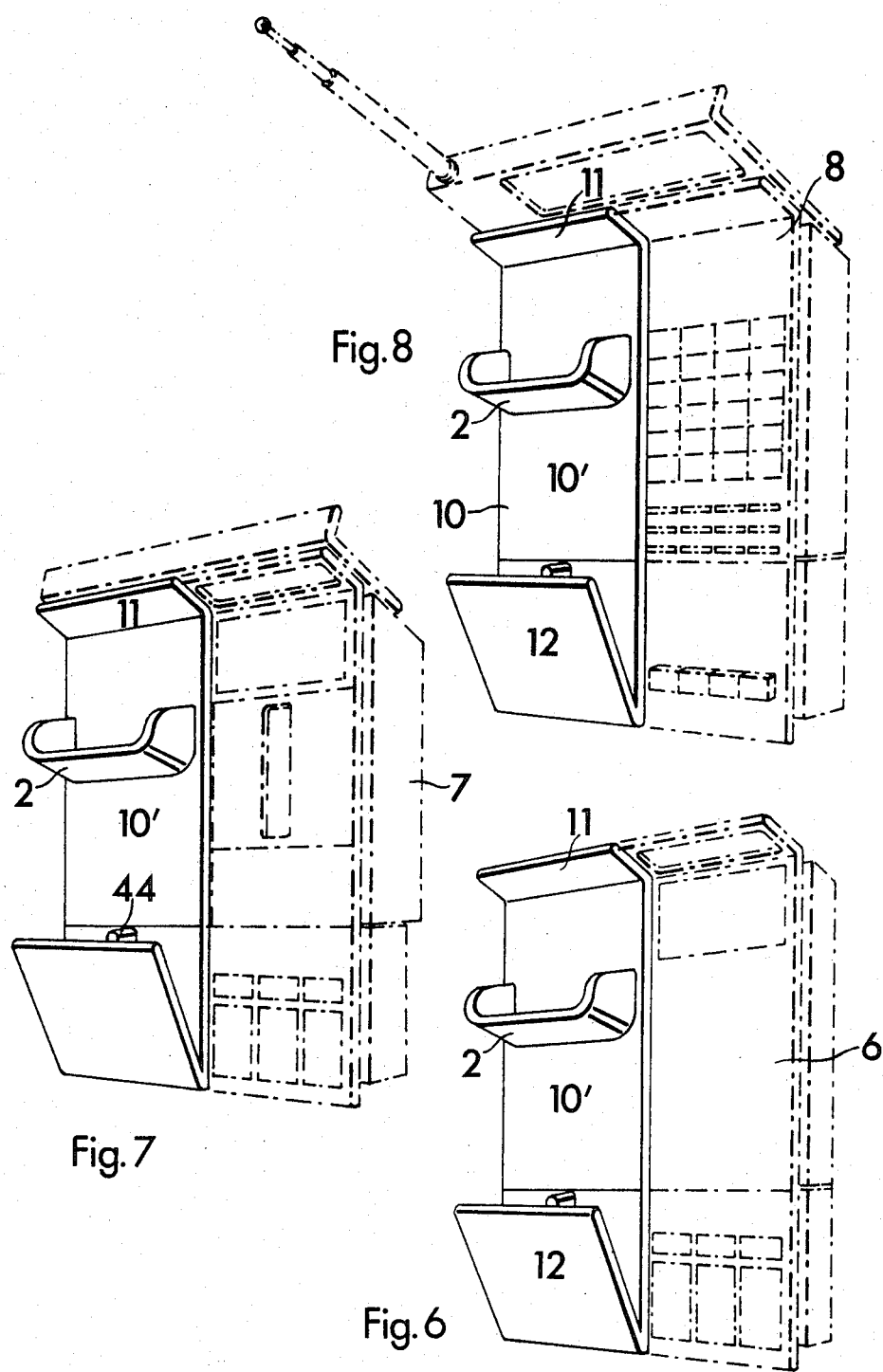

SUPPORT FOR A ONE-PIECE TELEPHONE

BACKGROUND OF THE INVENTION

The invention relates to a support or rest for a one-piece telephone, that is a telephone apparatus of the type in which a telephone hand set incorporates, as well as the microphone and receiver, the sequence switch device (dialing device), the bell and even the switch hooks. The support of the present invention therefore serves only the function of supporting the telephone and engaging the switch hooks to turn off the telephone apparatus automatically when it is replaced on the rest.

In the current state of the art there are in fact numerous types of support for one-piece telephones. These, however, are made of rigid, cumbersome and expensive materials and are not suitable for adaptation to different uses from the basic one for which they have been designed. The complicated form of existing supports, and the fact that they are intended for a specific and limited use, involve moldings and pressings of significant cost.

The telephone apparatus support or rest of the present invention, on the other hand, is a very simple and effective structure for fulfilling the required purpose, being in the form of a flat oblong plate or slab which at opposite ends is provided with inclined end portions, a shorter end portion at one end lying at an obtuse angle to the plate, and a longer end portion at the other end lying at an acute angle to the plate.

OBJECTS OF THE INVENTION

A primary object of the present invention is to provide a support or rest for a one-piece telephone, which will be simple, robust and economical to produce.

A further object of the present invention is to overcome the disadvantages of known such rests for one-piece telephones in particular the complex and expensive moldings and pressings which they require.

Another object of the present invention is to provide a support or rest for a one-piece telephone which can be used as a wall support or as a table support.

A further object of the present invention is to provide a support or rest for a one-piece-telephone which can be used entirely on its own as an independent piece of equipment, or can be used in conjunction with other apparatus as a front panel thereof. For example, the telephone support or rest of the present invention may be used in conjunction with or as a front or upper panel of a portable radio or an intercom system, a register or a private switchboard.

Yet a further object of the present invention is to provide a support or rest for a one-piece telephone which is able to absorb the impacts due to heavy-handed or deliberately forceful replacement of the telephone at the end of a conversation.

Still another object of the present invention is to provide a support or rest for a one-piece telephone which will be silent in use, even when the telephone is replaced hastily or excessively firmly, so that no noise is perceptible at the other end of the telephone line to a caller who may not at the time have hung up his telephone.

SUMMARY OF THE INVENTION

According to the present invention, there is provided a support for a one-piece telephone, comprising a base plate of generally rectangular form having means for receiving and supporting a part of a one-piece telephone, at least one protuberance projecting from said base plate, said protuberance being shaped and positioned to engage the switch hook of a telephone when such is placed on the said support whereby automatically to switch off said telephone when it is placed in a predetermined orientation on said support.

Preferably the telephone support of the present invention is entirely or at least partly made from a resiliently deformable material with the particular purpose of serving as a shock absorber for knocks occuring during hooking up of the telephone hand set and consequently for reducing the noise perceptible at the other end of the line to the other telephone user who may not yet have hung up his telephone.

The support of the present invention has a main body portion in a substantially flat, plate-like shape which allows it to be used not only as an independent piece of equipment, but also as a front panel of more complex apparatus such as a portable radio, a register, an intercom or the like. In such a case the particular function of the support and its resiliently deformable nature are such as to substantially avoid damage not only to the telephone itself but also to the apparatus to which it is coupled, such damage being possible in the absence of the features of the present invention due to knocks occuring, each time with a certain consistency, due to the replacement of the telephone on the receiver. In fact, it is known the telephones and the apparatus connected to these often bear the brunt of the state of tension aroused by the conversations of the telephone users.

A better understanding of the nature and characteristics of the present invention will be obtained from a reading of the following detailed description with reference to the accompanying drawings, provided purely by way of non-limitative example:

BRIEF DESCRIPTION OF THE DRAWINGS

FIG. 2 is substantially similar to FIG. 1, but is a front view, with the telephone indicated in dot and dash line;

FIG. 3 is a side view of the apparatus shown in FIG. 2;

FIG. 4 is a rear view of the apparatus of FIGS. 2 and 3;

FIG. 5 is a fragmentary perspective of part of the back of the support, showing in detail the means by which the device can be suspended, taken on the section line V—V of FIG. 4.

FIG. 6 is a perspective view illustrating, on a slightly reduced scale, one example of use of the support according to the present invention as a component in an intercom system, illustrated in dot and dash lines;

FIG. 7 illustrates, also as a perspective view, and on the same scale as in FIG. 6, an example of the use of the support according to the present invention as a component of a subscriber switchboard, illustrated in dot and dash line; and FIG. 8 also illustrates in perspective and on the same scale as FIGS. 6 and 7, an example of the use of the support according to the present invention as a component of a radio telephone illustrated in dot and dash line.

DESCRIPTION OF THE PREFERRED EMBODIMENT

Figure 1:
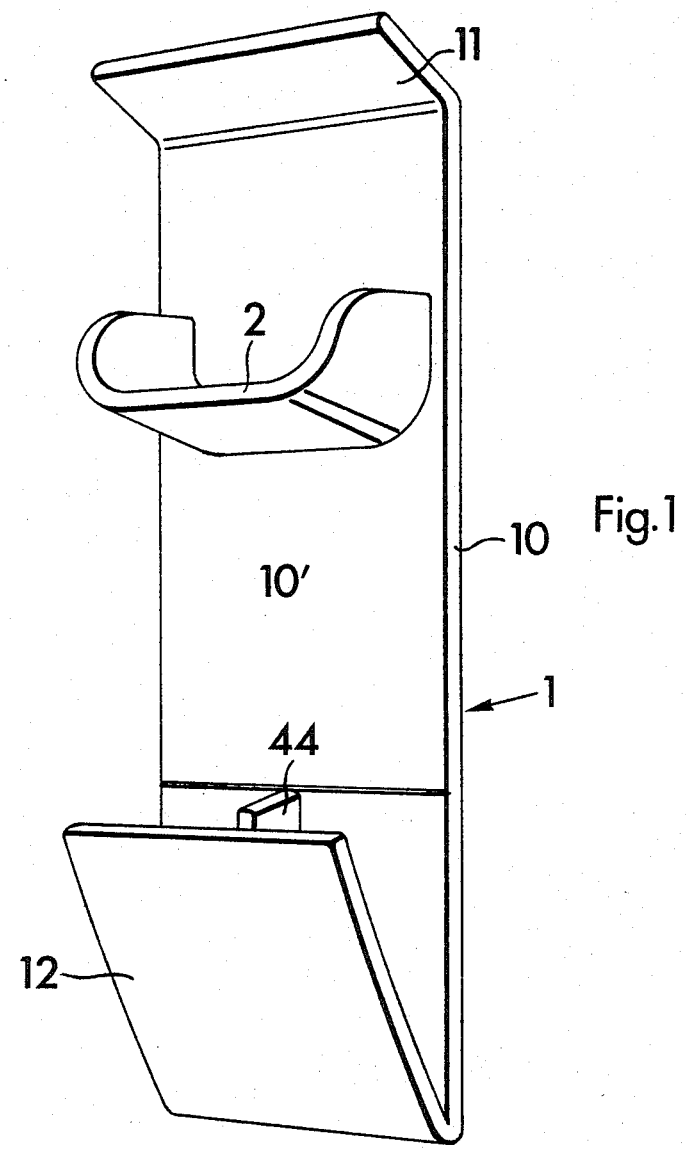
FIG. 1 is a substantially front perspective view of a support for a one-piece telephone according to the present invention.

With reference to the Figures of the drawings, according to the present invention a support 1 for a one-piece telephone is substantially constituted by a flat, relatively thin plate 10 preferably made of a resiliently deformable but semi-rigid material. This plate 10 has inclined end portions 11 and 12 and, particularly, the upper end 11 (as viewed in FIG. 1) is inclined at an obtuse angle and the lower end 12 at an acute angle. Moreover, from the front surface 10' of the plate 10 there extends a projection 2 in the form of a saddle which is tapered in such a way as to form a hook for the telephone. In other words, as will be better seen in FIG. 3, the projections 11, 12 and 2 constitute a seat for a one-piece telephone 3, which seat perfectly embraces and is correspondingly shaped so that it holds it firmly even if the support is in a vertical position as shown in FIG. 1.

The plate 10 is provided at the back with a plurality of ribs 4 in slight relief, which serve to constitute an antifriction support, and to give rise to a space for the insertion of the head of a screw or the like into the dove-tail hollow 40 formed in the projection 41.

In order partially to reinforce the end position 12, the function of which is above all that of engaging the switch hook 30 of the telephone, there is a reinforcing rib 44 which limits the flexural movements of the end portion 12.

The construction of the support is such that it can, without any modification, be applied to particularly compact apparatus such as an intercom 6, a switchboard 7 or a radio telephone 8. Naturally the support itself can be formed as a system for a plurality of telephones to be carried alongside one another, or else it can have an adjacent available surface of the same base plate for supporting the telephone when it is required to put this down without hanging up and interrupting the telephone connection.

In practice, the dimensions, as well as the materials used can be varied in any way, without by this departing from the spirit and scope of the present invention as defined in the appended claims.

What is claimed is:

1. A support for a one-piece telephone having a switch hook intermediate the ends of a face surface, said support comprising:
   a base plate of generally rectangular form having means for receiving and supporting a part of the face surface of said one-piece telephone;
   wherein said base plate is of a one-piece construction having a planar main body portion, a planar first end portion and a planar second end portion;
   wherein said planar first end portion of said base plate extends upwardly from a lower end of said planar main body portion at an acute angle with respect to said main body portion, said upwardly extending portion being positioned to engage the switch hook intermediate the ends of the face surface when the telephone is placed in a predetermined orientation on said support, whereby said upwardly extending portion automatically switches off said telephone;
   wherein said planar second end portion of said base plate extends upwardly from an upper end of said planar main body portion at an obtuse angle with respect to said main body portion;
   wherein said means for receiving and supporting said one-piece telephone comprises said second end portion and a tapered, generally saddle-shaped projection extending from said front face of said main body portion, said saddle-shaped projection having a concave shape such as to closely fit the cooperating surfaces of the telephone in the manner of a mechanical hook; and
   wherein said upwardly extending lower portion is remote from said saddle-shaped projection thereby defining an open area which permits access to said front face of said main body portion.

2. The invention as defined in claim 1, wherein the rear face of said base plate has a plurality of parallel elongate ribs thereon defining a recess for receiving suspension means such as a screw head, by which said support can be suspended from a wall.

3. The invention as defined in claim 1, wherein said base plate including said first and second end portions thereof, and said projection constituting said means for receiving and supporting a part of said one-piece telephone, are all made of a resiliently deformable material.

4. The invention as defined in claim 1, wherein said base plate, including said first and second end portions thereof, and said projection constituting said means for receiving and supporting a part of said one-piece telephone, are all made of a resiliently deformable rubber material.

5. The invention as defined in claim 1 and further comprising a rib extending between said base portion of said plate and at least a portion of said first end portion for supporting the end portion in its inclined position.

6. In combination with a one-piece telephone having a switch hook intermediate the ends of a face surface, a support comprising:
   a base plate of generally rectangular form having a planar main body portion with a front face and a rear face;
   a tapered generally saddle-shaped projection extending from said front face of said main body portion; said projection being shaped to constitute means for receiving and supporting a portion of said one-piece telephone;
   a planar first end portion of said base plate extending upwardly at an acute angle to said main body portion constituting an abutment for the switch hook of said one-piece telephone, said first end portion being reinforced with a reinforcing rib spanning at least part of the space between said first end portion and said main body portion of said base plate; and
   a planar second end portion of said base plate extending upwardly at an obtuse angle to said main body portion and forming with said saddle-shaped projection a cradle for receiving a portion of said one-piece telephone;
   wherein said main body portion, said first end portion and said second end portion of said base plate are integrally constructed.

7. The support for a one-piece telephone of claim 6 in combination with a one-piece telephone and formed as a front panel of a radio telephone.

8. The invention as defined in claim 6 wherein said plate forms the front panel of an intercom system unit.

9. The invention as defined in claim 6 wherein said plate forms the front panel of a switch board.

10. The invention as defined in claim 6 wherein said flat plate forms a front panel of a portable radio housing.

* * * * *

UNITED STATES PATENT AND TRADEMARK OFFICE
CERTIFICATE OF CORRECTION

PATENT NO. : 4,527,018
DATED : July 2, 1985
INVENTOR(S) : Giovanni Offredi

It is certified that error appears in the above-identified patent and that said Letters Patent is hereby corrected as shown below:

In the abstract, line 3 before "apparatus" insert

--dialing--.

Signed and Sealed this

Fifteenth Day of October 1985

[SEAL]

Attest:

DONALD J. QUIGG

Attesting Officer

Commissioner of Patents and
Trademarks—Designate